United States Patent
Lee et al.

(10) Patent No.: US 9,785,017 B2
(45) Date of Patent: Oct. 10, 2017

(54) LIQUID CRYSTAL DISPLAY

(71) Applicant: Samsung Display Co., Ltd., Yongin-si, Gyeonggi-Do (KR)

(72) Inventors: Yun-Gun Lee, Asan-si (KR); Min Wook Park, Asan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 64 days.

(21) Appl. No.: 14/743,772

(22) Filed: Jun. 18, 2015

(65) Prior Publication Data

US 2016/0170273 A1  Jun. 16, 2016

(30) Foreign Application Priority Data

Dec. 12, 2014 (KR) ........................ 10-2014-0179319

(51) Int. Cl.
  *G02F 1/1343* (2006.01)
  *G02F 1/1339* (2006.01)
  *G02F 1/139* (2006.01)

(52) U.S. Cl.
  CPC ...... *G02F 1/134309* (2013.01); *G02F 1/1393* (2013.01); *G02F 2001/13396* (2013.01); *G02F 2201/123* (2013.01)

(58) Field of Classification Search
  CPC .............................................. G02F 1/134309
  See application file for complete search history.

(56) References Cited

U.S. PATENT DOCUMENTS

| 7,834,962 | B2 | 11/2010 | Satake et al. | |
| 2009/0161048 | A1* | 6/2009 | Satake | G02F 1/133305 349/110 |
| 2010/0020283 | A1* | 1/2010 | Suzuki | G02F 1/134363 349/141 |
| 2013/0009176 | A1* | 1/2013 | Kang | G02F 1/13394 257/88 |
| 2013/0100386 | A1* | 4/2013 | Kim | G02F 1/13394 349/110 |
| 2013/0215341 | A1* | 8/2013 | Rho | G02F 1/134309 349/15 |
| 2014/0043549 | A1* | 2/2014 | Taniguchi | G02F 1/13394 349/15 |
| 2015/0036073 | A1 | 2/2015 | Im et al. | |
| 2015/0085220 | A1* | 3/2015 | Chen | G02F 1/133606 349/62 |

FOREIGN PATENT DOCUMENTS

| KR | 10-2010-0105914 A | 10/2010 |
| KR | 10-2013-0137457 A | 12/2013 |

\* cited by examiner

*Primary Examiner* — Edmond Lau
(74) *Attorney, Agent, or Firm* — Robert E. Bushnell, Esq.

(57) ABSTRACT

Provided is a liquid crystal display including: a display panel which includes a lower panel including a thin film transistor, a pixel electrode connected to the thin film transistor, and a light blocking member; an upper panel facing the lower panel; and a liquid crystal layer positioned between the lower panel and the upper panel and including liquid crystal molecules. The display panel is a curved display panel which is curved on a first axis. The pixel electrode has long sides and short sides, and the long sides are arranged to be substantially parallel with a second axis perpendicular to the first axis.

19 Claims, 7 Drawing Sheets

LIQUID CRYSTAL DISPLAY

CLAIM OF PRIORITY

This application claims priority to and all the benefits accruing under 35 U.S.C. 119 of Korean Patent Application No. 10-2014-0179319 filed in the Korean Intellectual Property Office ("KIPO") on Dec. 12, 2014, the entire contents of which are incorporated herein by reference.

BACKGROUND OF THE INVENTION

1. Field of Disclosure

The present invention relates to a liquid crystal display.

2. Description of the Related Art

A liquid crystal display (LCD) which is one of the most common types of flat panel displays (FPDs) currently in use, includes two sheets of display panels with field generating electrodes such as a pixel electrode and a common electrode, and a liquid crystal layer interposed therebetween. The liquid crystal display generates an electric field in the liquid crystal layer by applying voltage to the field generating electrodes, and determines the direction of liquid crystal molecules of the liquid crystal layer by the generated electric field, thus controlling polarization of incident light so as to display images.

Among the liquid crystal displays, there is a vertically aligned mode liquid crystal display, in which liquid crystal molecules are aligned so that long axes thereof are vertical to the display panels while the electric field is not applied. In the vertically aligned mode liquid crystal display, it is recognized that it is important to ensure a wide viewing angle. In order to ensure the wide viewing angle, a method of forming a plurality of domains in which tilted directions of liquid crystal molecules are controlled to be different from each other by forming cutouts such as minute slits in the field generating electrode, and the like are used. When the electric field is generated in the liquid crystal layer, in order to predetermine a direction for behavior of the liquid crystal molecules, the liquid crystal molecules may be aligned to have pretilts.

Recently, the liquid crystal display tends to be larger, a curved display panel has been developed in order to enhance engagement and presence of viewers, and a liquid crystal display adopting the curved display panel has been in the limelight. In the case of the curved display panel, alignment between an upper panel and a lower panel may be distorted. As a result, a region in which a pretilt direction by the upper panel and a pretilt direction by the lower panel are misaligned may be generated, and in the region, texture occurs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a liquid crystal display having advantages of reducing texture that occurs due to misalignment between upper and lower panels in a curved display panel.

An exemplary embodiment of the present invention provides a liquid crystal display including: a display panel which includes a lower panel including a thin film transistor, a pixel electrode connected to the thin film transistor, and a light blocking member; an upper panel facing the lower panel; and a liquid crystal layer positioned between the lower panel and the upper panel and including liquid crystal molecules. The display panel may be a curved display panel which is curved on a first axis. The pixel electrode may have long sides and short sides, and the long sides may be arranged to be substantially parallel with a second axis perpendicular to the first axis.

The short sides of the pixel electrode may be arranged to be substantially parallel with the first axis.

The lower panel may further include a column spacer positioned on the light blocking member.

The column spacer may be formed of the same material as the light blocking member.

The upper panel may include a common electrode, and the pixel electrode may include a plurality of domains in which tilted directions of the liquid crystal molecules are differently controlled.

The pixel electrode may include stems which form a boundary between adjacent domains.

The pixel electrode may further include a plurality of minute branches which extends in different directions in different domains.

The stems may include a first stem and a second stem which cross each other to form a cross, and the plurality of minute branches may extend in different directions in four domains which are divided by the first and second stems.

The first stem may be arranged to be substantially parallel to the first axis, and the second stem may be arranged to be substantially parallel to the second axis.

The length of the first stem may be larger than the length of the second stem.

The common electrode may include an opening which faces at least one of the first and second stems and is formed in parallel with it.

The thin film transistor may be positioned between two pixel electrodes which are adjacent to each other in the first axial direction.

A ratio of the short side to the long side of the pixel electrode may be about 3:1.

The lower panel may further include a color filter.

The light blocking member may be formed to cover a peripheral area of the pixel electrode.

The column spacer may include a main column spacer which is relatively high and a sub column spacer which is relatively low.

The display panel may be a curved display panel which is further curved based on the second axis (not shown).

According to the exemplary embodiment of the present invention, it is possible to reduce an occurrence area of texture to improve problems such as deterioration of transmittance, occurrence of spots, and delay of a response speed, and therefore improve image quality.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 6 is a diagram exemplifying misalignment of pretilt directions and texture due to misalignment between an upper panel and a lower panel which occurs in a curved display panel in the liquid crystal display according to the exemplary embodiment of the present invention; and.

DETAILED DESCRIPTION OF THE INVENTION

Figure 1:
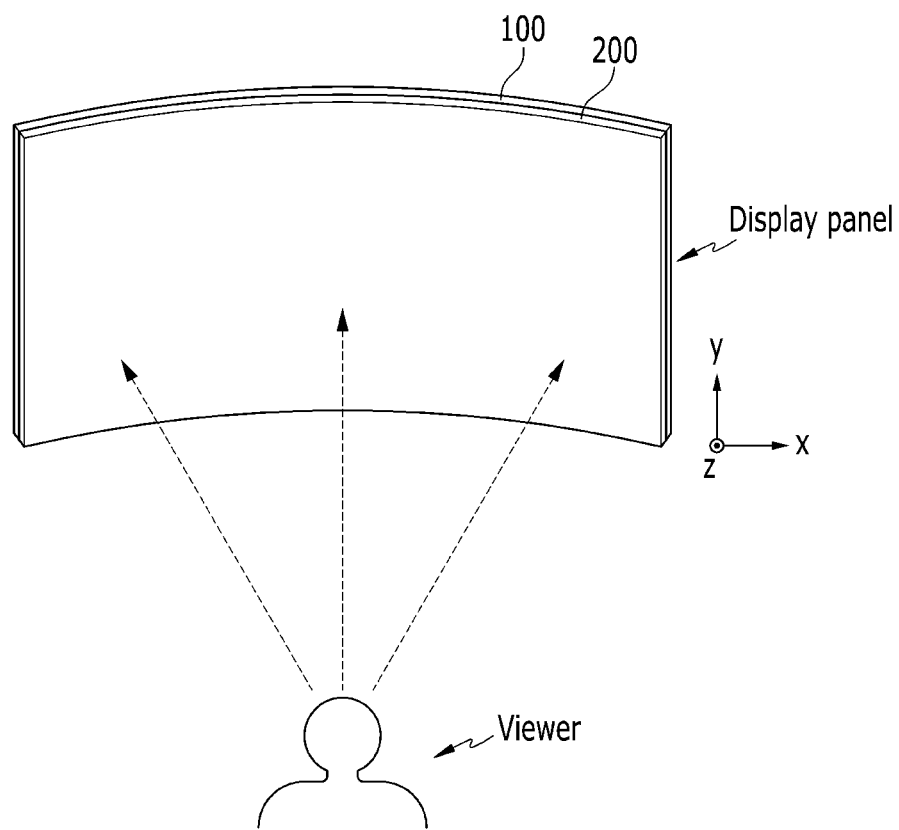
FIG. 1 illustrates an example of a curved display panel of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a liquid crystal display according to an exemplary embodiment of the present invention will be described in detail with reference to the accompanying drawings.

FIG. 1 illustrates an example of a curved display panel of a liquid crystal display according to an exemplary embodiment of the present invention.

Referring to FIG. 1, a liquid crystal display according to the exemplary embodiment of the present invention includes a display panel. Although not illustrated, the liquid crystal display includes a gate driver and a data driver as drivers for driving a liquid crystal panel, and a signal controller for controlling the drivers. Further, since the display panel of the liquid crystal display is a light receiving element with a non-emission property, the liquid crystal display includes a backlight unit (not illustrated) for providing light to the display panel on the bottom of the display panel.

The display panel includes a lower panel 100 and an upper panel 200 which face each other to be attached to each other, and a liquid crystal layer (not illustrated) formed therebetween. Alignment layers (not illustrated) are formed on inner surfaces of the two panels 100 and 200 and may be vertical alignment layers. Polarizers (not illustrated) are attached to outer surfaces of the two panels 100 and 200, and polarization axes of the two polarizers may be perpendicular to each other.

The display panel has a generally uniform thickness, but is a curved display panel. That is, in a plane defined by an x axis corresponding to a horizontal axis and a y axis corresponding to a vertical axis, the display panel is curved on the y axis and forms a curved surface. The curved surface is a concave curved surface in which the center of the display panel retreats behind left and right edges when viewed from the front side on which a screen of the display panel is displayed. Accordingly, when a viewer views the display panel, a difference between a distance C from the center of the display panel and distances L and R from the left and right edges is decreased as compared with a general display panel, and the screen gives an impression of surrounding the viewer. As a result, engagement and presence of the viewer may be enhanced.

According to an exemplary embodiment, the display panel may have a curved surface which is curved on the x axis, or have a curved surface which is curved on the y axis and also curved on the x axis.

Hereinafter, the liquid crystal display according to the exemplary embodiment of the present invention will be described in more detail with reference to FIGS. 2, 3, and 4.

Figure 2:
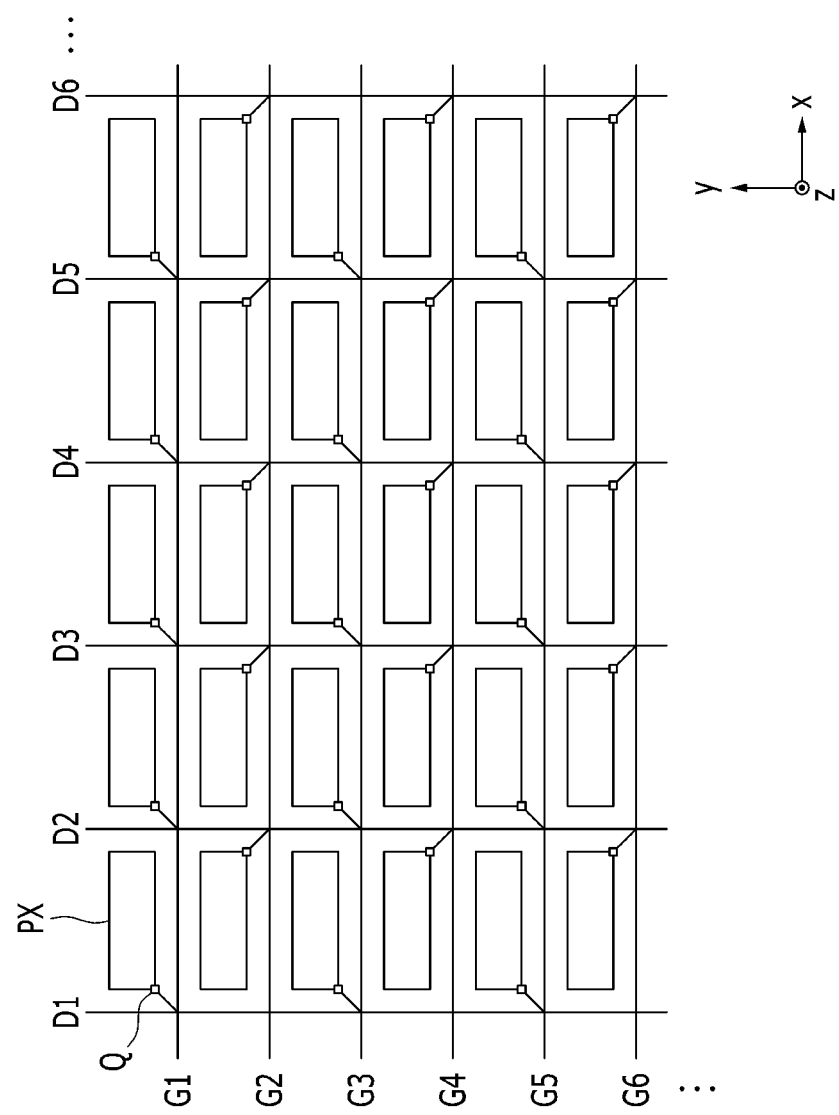
FIG. 2 illustrates a pixel arrangement in the liquid crystal display according to the exemplary embodiment of the present invention.
Figure 3:
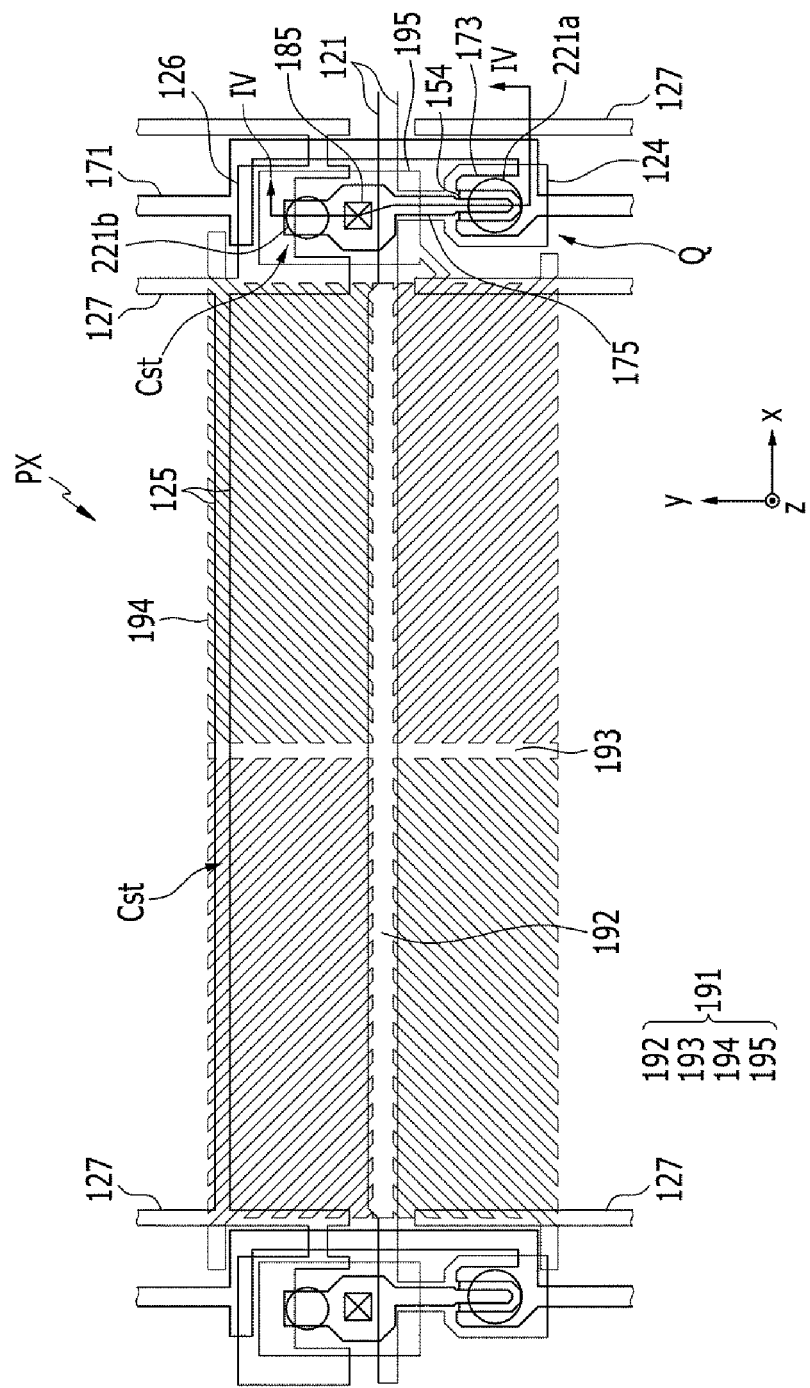
FIG. 3 is a layout view of one pixel of the liquid crystal display according to the exemplary embodiment of the present invention.
Figure 4:
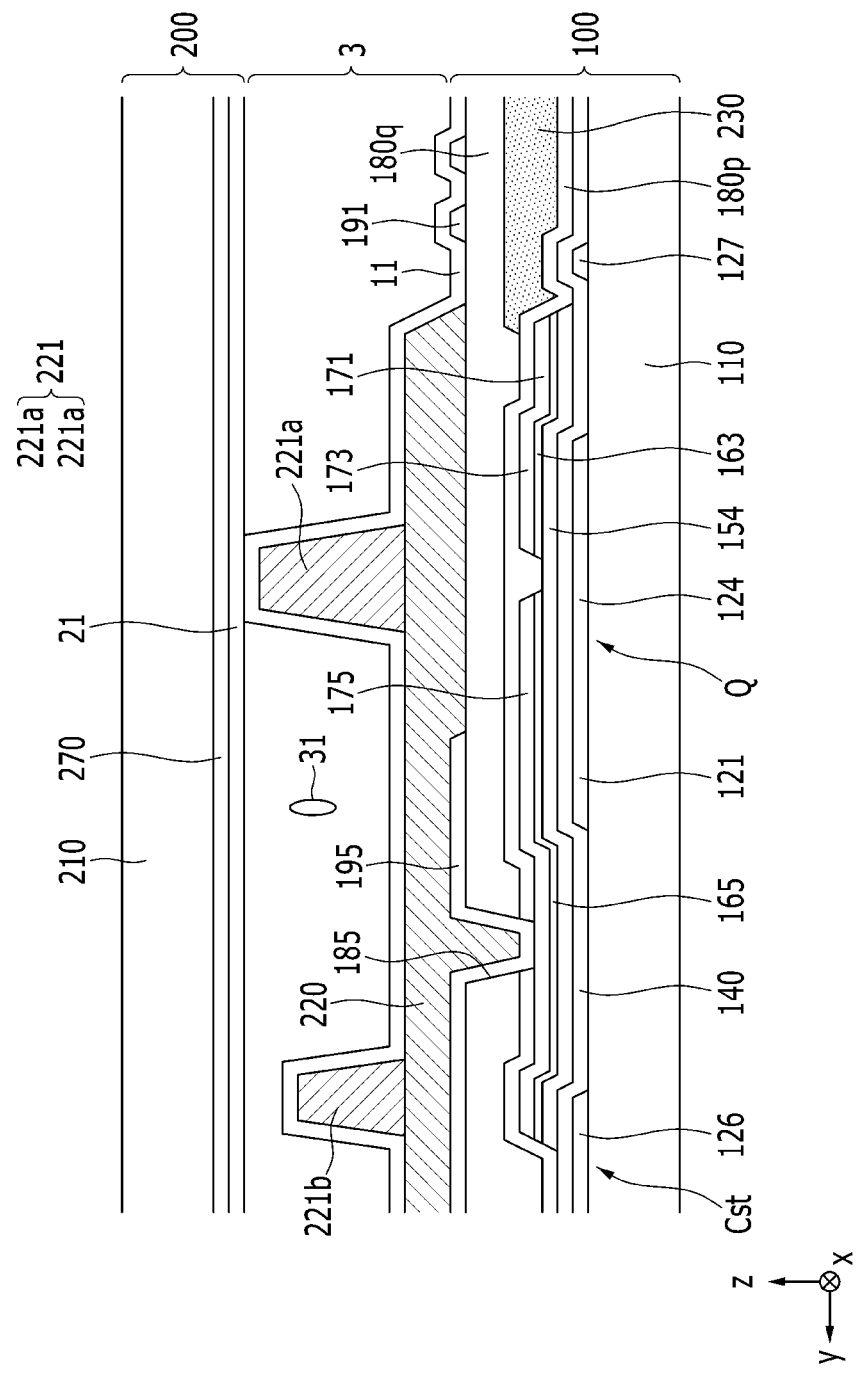
FIG. 4 is a cross-sectional view of the liquid crystal display of FIG. 2 taken along line IV-IV of FIG. 3.

FIG. 2 illustrates a pixel arrangement in the liquid crystal display according to the exemplary embodiment of the present invention, FIG. 3 is a layout view of one pixel of the liquid crystal display according to the exemplary embodiment of the present invention, and FIG. 4 is a cross-sectional view of the liquid crystal display of FIG. 2 taken along line IV-IV of FIG. 3.

Referring to FIG. 2, the liquid crystal panel includes a plurality of signal lines and a plurality of pixels PX which is connected to the plurality of signal lines and arranged substantially in a matrix form.

The signal lines include a plurality of gate lines G1, G2, . . . transferring gate signals and a plurality of data lines D1, D2, . . . transferring data voltages. The gate lines extend substantially in a row direction and may be substantially parallel to each other. Each gate line may be connected to pixels at an upper side of the gate line as shown in FIG. 2, and may be connected to pixels at a lower side of the gate line (not shown). The data lines extend substantially in a column direction and may be substantially parallel to each other. Each data line may be alternately connected to pixels at a left side and a right side of the data line, may also be connected to only the pixel at the left side or the right side of the data line, and may be connected by various methods in addition to these methods. In FIG. 2, an example in which the data line is alternately connected to the pixels at the left side and the right side of the data line is illustrated, and in this case, dot inversion driving may be performed by inverting a polarity of the data voltage applied to the adjacent data line.

The pixel PX may generally have a substantially quadrangular shape having long sides and short sides, and the long sides are disposed to be substantially parallel to the x axis. In other words, the pixel PX disposed in the display panel has a quadrangular shape of which a width is larger than a length. A ratio of a short side to a long side may be, for example, about 1:3 or 1:more than 3, but is not limited thereto and may have various ratios.

The pixel PX includes a liquid crystal capacitor (not illustrated) and a thin film transistor Q which is a switching element connected with the liquid crystal capacitor. A control terminal of the thin film transistor Q is connected to the gate line, an input terminal is connected with the data line, and an output terminal is connected to the liquid crystal capacitor.

Referring to FIGS. 3 and 4, a planar structure of a pixel and a cross-sectional structure of a part of the pixel in the liquid crystal display according to the exemplary embodiment of the present invention are illustrated.

The liquid crystal display includes a lower panel 100 and an upper panel 200 facing each other, and a liquid crystal layer 3 formed between the panels 100 and 200.

First, the lower panel 100 will be described.

A gate line 121 and a storage electrode line 125 are formed on a lower substrate 110 which is an insulation substrate made of transparent glass or plastic. The gate line 121 transfers a gate signal including a gate-on voltage and a gate-off voltage and mainly extends in a horizontal direction. The storage electrode line 125 transfers a predetermined voltage such as a common voltage and mainly extends in a parallel direction to the gate line 121. The storage electrode line 125 may include a main line extending to be substantially parallel to the gate line 121, a branch portion 127 extending to be substantially vertical to the gate line 121, and a storage electrode 126.

On the gate line 121 and the storage electrode line 125, a gate insulating layer 140 is formed, and on the gate insulating layer 140, a semiconductor 154 which may be made of hydrogenated amorphous or polycrystalline silicon or an oxide semiconductor is positioned. An ohmic contact 165 is formed on the semiconductor 154. In the case where the semiconductor 154 is the oxide semiconductor, the ohmic contact may be omitted.

On the ohmic contact 165 and the gate insulating layer 140, a data line 171 and a drain electrode 175 are formed. The data line 171 transfers a data voltage and mainly extends in a vertical direction to cross the gate line 121. The data line 171 includes a source electrode 173 extending toward the gate electrode 124. The data line 171 may be periodically bent. The drain electrode 175 includes a portion which is separated from the data line 171 and faces the source electrode 173. The gate electrode 124, the source electrode 173, and the drain electrode 175 form a thin film transistor Q together with the semiconductor 154.

A first passivation layer 180p is formed on the thin film transistor Q. The first passivation layer 180p may include an inorganic insulating layer such as silicon nitride or silicon oxide. The first passivation layer 180p may prevent a pigment of a color filter 230 from flowing into the semiconductor 154.

The color filter 230 is formed on the first passivation layer 180p. The pixel may display one of the primary colors of red, green, and blue by the color filter 230. According to an exemplary embodiment, the color filter 230 may also be positioned on the upper panel 200, for example, on an upper substrate 210 (not shown).

A second passivation layer 180q is formed on the color filter 230. The second passivation layer 180q may include an inorganic insulating layer such as silicon nitride or silicon oxide. The passivation layer 180q may prevent the color filter 230 from being lifted and suppress the contamination of the liquid crystal layer 3 due to an organic material such as a solvent flowing into from the color filter 230, thereby preventing a defect such as an afterimage which may be caused when a screen is driven.

In the first passivation layer 180p and the second passivation layer 180q, a contact hole 185 exposing the drain electrode 175 is formed.

On the second passivation layer 180q, a pixel electrode 191 is formed. The pixel electrode 191 may be made of a transparent conductive material such as indium tin oxide (ITO) and indium zinc oxide (IZO), or a reflective metal such as aluminum, silver, chromium, or an alloy thereof. The pixel electrode 191 of each pixel is separated from the pixel electrode 191 of the adjacent pixel.

The pixel electrode 191 includes a cross stem configured by a horizontal stem 192 and a vertical stem 193 perpendicular to the horizontal stem 192. The pixel electrode 191 is divided into four domains by the horizontal stem 192 and the vertical stem 193. The horizontal stem 192 and the vertical stem 193 form a boundary between the adjacent domains.

The pixel electrode 191 may further include a plurality of minute branches 194 which is formed in each domain. The minute branches 194 may obliquely extend outward from the horizontal stem 192 or the vertical stem 193.

An overall shape of the pixel electrode 191 may be a quadrangle, and a substantially rectangle. In the pixel electrode 191, a horizontal length may be relatively larger than a vertical length.

The pixel electrode 191 may further include a protrusion 195 for connecting with other layers, and the protrusion 195 may be connected with the drain electrode 175 in the contact hole 185. The pixel electrode 191 may receive a data voltage from the drain electrode 175.

The pixel electrode 191 may overlap with the gate line 192 positioned on another layer, and for example, as illustrated in the drawing, the horizontal stem 192 may be arranged to overlap with the gate line 121. According to an exemplary embodiment, the pixel electrode 191 may be arranged between two adjacent gate lines extending in the horizontal direction so as not to overlap with the adjacent gate lines.

On the second passivation layer 180q, a light blocking member 220 is formed. The light blocking member 220 is called a black matrix BM. The light blocking member 220 may be formed so as not to overlap with the pixel electrode 191 except for the protrusion 195 of the pixel electrode. In other words, the light blocking member 220 is formed to cover a peripheral region of the pixel electrode 191 in a plane view to prevent light from being leaked or reflected between the pixel electrodes 191.

If the light blocking member 220 is positioned on the upper panel 200, the alignment between the lower panel 100 and the upper panel 200 is distorted when implementing the curved display panel, the alignment may be distorted even between the light blocking member 220 and the pixel electrode 191. As a result, the light blocking member 220 may cover a part of the pixel electrode 191, and therefore, an aperture ratio may be declined. According to the exemplary embodiment of the present invention, since the light blocking member 220 is positioned on the lower panel 100, the deterioration of the aperture ratio due to the light blocking member 220 does not occur when the curved display panel is implemented.

A column spacer 221 is formed on the light blocking member 220. The column spacer 221 may include a main column spacer 221a which is relatively high and a sub column spacer 221b which is relatively low. The column spacer 221 serves to maintain a cell gap which is a distance between the lower panel 100 and the upper panel 200. The column spacer 221 may be formed of the same material as the light blocking member 220. For example, the column spacer 221 and the light blocking member 220 may be simultaneously formed by forming a layer having a predetermined thickness on a photoresist with a material in which chromium-based metal materials or carbon-based organic materials are mixed and patterning the layer by using a halftone mask or a slit mask.

A lower alignment layer 11 is formed above the pixel electrode 191. The lower alignment layer 11 may be formed to have a pretilt.

When describing the upper panel 200, a common electrode 270 is formed on the upper substrate 210 which is an insulation substrate. The common electrode 270 may be made of a transparent conductor such as ITO and IZO. The common electrode 270 may receive a common voltage. The common electrode 270 is formed on the entire surface of the upper substrate 210, and the common electrodes 270 of the plurality of pixels PX are connected to each other. The common electrode 270 may include a cutout or not. An upper alignment layer 21 is formed on the common electrode 270. The upper alignment layer 21 may have a pretilt.

In the upper panel 200, since the common electrode 270 and the upper alignment layer 21 are formed all over the upper panel 200, the inner surface of the upper panel 200 may be formed to be relatively flat and smooth without undulation. Accordingly, like the exemplary embodiment of the present invention, when the column spacer 221 is positioned on the lower panel 100, even though the end of the column spacer 221 moves when forming the curved display panel by curving the display panel, the end is not held on the inner surface of the upper panel 200. According to an exemplary embodiment, the upper panel 200 may include, for example, a color filter between the upper substrate 210 and the common electrode 270.

The liquid crystal layer 3 positioned between the lower panel 100 and the upper panel 200 includes liquid crystal molecules 31 having negative dielectric anisotropy. The liquid crystal molecules 31 are aligned so that long axes thereof are substantially vertical to the surfaces of the two panels 100 and 200 while the electric field is not generated in the liquid crystal layer 3, but when the electric field is generated, the liquid crystal molecules 31 are aligned to have pretilts which are slightly tilted in a tilt direction. When the electric field is generated by the pretilt of the liquid crystal molecule 31, the liquid crystal molecules 31 may be rapidly tilted in a pretilt direction to induce a tilted direction of the liquid crystal molecule 31 and improve the response speed of the liquid crystal molecule 31.

The pretilt of the liquid crystal molecule 31 may be formed through UV exposure while the electric field is generated in the liquid crystal layer 3, after preparing the display panel by mixing a photopolymerizable material such as reactive mesogen with the liquid crystal layer 3. In one pixel, since the tilt directions of the liquid crystal molecules 31 are different from each other for each domain as described below, the pretilt directions are also formed in different directions for each domain. The ultraviolet-ray exposure for forming the pretilt is performed in a flat state before the display panel is curved in the process. Accordingly, when the flat display panel is curved to be made into the curved display panel, the alignment between the lower panel 100 and the upper panel 200 is partially distorted, and as a result, the pretilt direction by the lower panel 100 and the pretilt direction by the upper panel 200 may be misaligned. In the region where the pretilt directions are misaligned, when the electric field is generated, a problem on the tilt direction of the liquid crystal molecule 31 occurs, and as a result, texture due to deterioration of transmittance and the like occurs and the response speed of the liquid crystal molecule 31 is decreased.

In the display panel, the electric field is generated between the pixel electrode 191 to which the data voltage is applied and the common electrode 270 to which the common voltage is applied. The electric field determines a direction of the liquid crystal molecule 31 of the liquid crystal layer 3 between the two electrodes 191 and 270, and transmittance of light passing through the liquid crystal layer 3 varies according to the direction.

The pixel electrode 191 and the common electrode 270 form a liquid crystal capacitor together with the liquid crystal layer 3 portion therebetween to maintain the applied voltage even after the thin film transistor Q is turned off. The pixel electrode 191 or the drain electrode 175 overlaps with the storage electrode line 125 with the gate insulating layer 140 or the passivation layers 180p and 180q therebetween to form a storage capacitor. The storage electrode line 125 including the storage electrode 126 and the branch portion 127 may mainly overlap with the pixel electrode 191 at the edge of the pixel electrode 191 or overlap with the drain electrode 175.

Hereinafter, domains of the pixel in which the tilt directions of the liquid crystal molecules are differently controlled will be described with reference to FIG. 5.

Figure 5:
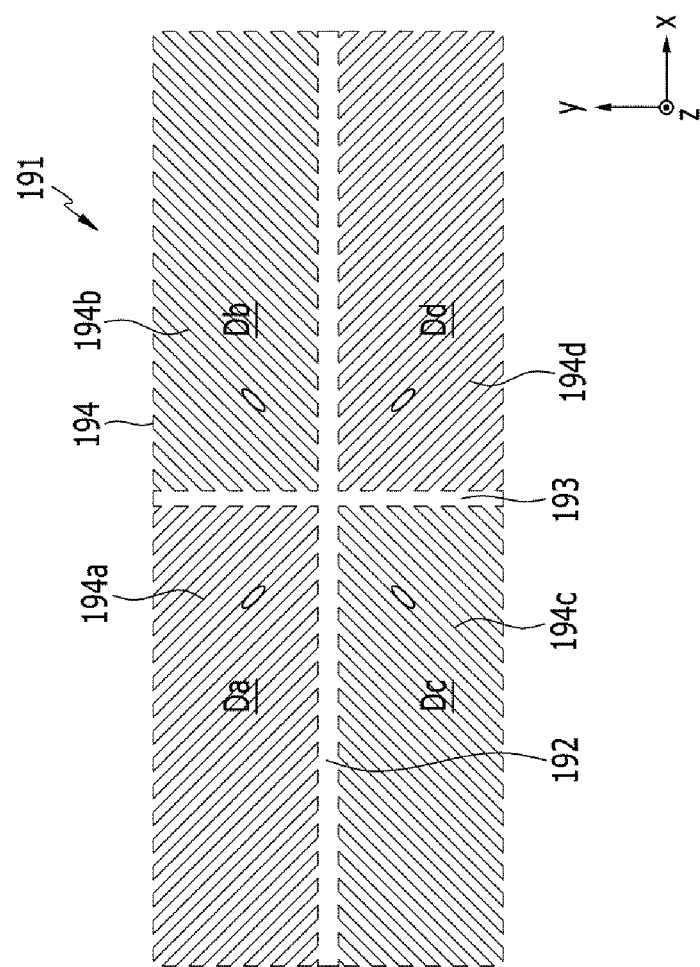
FIG. 5 is a plan view illustrating a domain of a pixel in the liquid crystal display according to the exemplary embodiment of the present invention.

FIG. 5 is a plan view illustrating domains of a pixel in the liquid crystal display according to the exemplary embodiment of the present invention.

The domains of the pixel are generally determined by a pattern of the pixel electrode. As described above in association with FIG. 3, the pixel electrode 191 has an overall quadrangular shape and includes a cross stem configured by a horizontal stem 192 and a vertical stem 193 perpendicular to the horizontal stem 192. The domains include a first domain Da, a second domain Db, a third domain Dc, and a fourth domain Dd which are divided by the horizontal stem 192 and the vertical stem 193. The first domain Da includes a plurality of first minute branches 194a, the second domain Db includes a plurality of second minute branches 194b, the third domain Dc includes a plurality of third minute branches 194c, and the fourth domain Dd includes a plurality of fourth minute branches 194d.

The first minute branches 194a extend obliquely in an upper left direction from the horizontal stem 192 or the vertical stem 193, and the second minute branches 194b extend obliquely in an upper right direction from the horizontal stem 192 or the vertical stem 193. The third minute branches 194c extend obliquely in a lower left direction from the horizontal stem 192 or the vertical stem 193, and the fourth minute branches 194d extend obliquely in a lower right direction from the horizontal stem 192 or the vertical stem 193.

Acute angles between the first to fourth minute branches 194a, 194b, 194c, and 194d and the horizontal stem 192 may be approximately 40 degrees to 45 degrees, but are not limited thereto, and may be properly controlled by considering display characteristics such as visibility of the liquid crystal display. The minute branches 194a, 194b, 194c, and 194d of two adjacent domains Da, Db, Dc, and Dd may be perpendicular to each other.

Widths of the minute branches 194a, 194b, 194c, and 194d may be about 2.5 μm to about 5.0 μm, and a distance between the adjacent minute branches 194a, 194b, 194c, and 194d in one domain Da, Db, Dc, or Dd may be about 2.5 μm to about 5.0 μm, but the present invention are not limited thereto. A ratio of the distance between the adjacent minute branches 194a, 194b, 194c, and 194d to the widths of the minute branches 194a, 194b, 194c, and 194d may be about 1.5:1 to about 1:1.5, but is not limited thereto and may be properly controlled by considering a display characteristic. The widths of the minute branches 194a, 194b, 194c, and

194d may not be constant, and for example, may be increased or decreased toward the horizontal stem 192 or the vertical stem 193.

When the data voltage is applied to the pixel electrode 191, the sides of the first to fourth minute branches 194a, 194b, 194c, and 194d distort the electric field to create a horizontal component which determines a tilt direction of the liquid crystal molecule 31. The horizontal component of the electric field is substantially horizontal to the sides of the first to fourth minute branches 194a, 194b, 194c, and 194d. Accordingly, as illustrated in FIG. 5, the liquid crystal molecule 31 is tilted in a parallel direction to length directions of the minute branches 194a, 194b, 194c, and 194d. Since one pixel electrode 191 includes four domains Da to Dd which have different length directions of the minute branches 194a, 194b, 194c, and 194d, the tilt directions of the liquid crystal molecules 31 are substantially four directions, and four domains which have different alignment directions of the liquid crystal molecules 31 are formed in the liquid crystal layer 3. As such, when the tilt directions of the liquid crystal molecules 31 are various, a reference viewing angle of the liquid crystal display is increased.

Hereinafter, an effect in which texture is reduced in the liquid crystal display according to the exemplary embodiment of the present invention will be described with reference to FIGS. 6 and 7.

Figure 6:
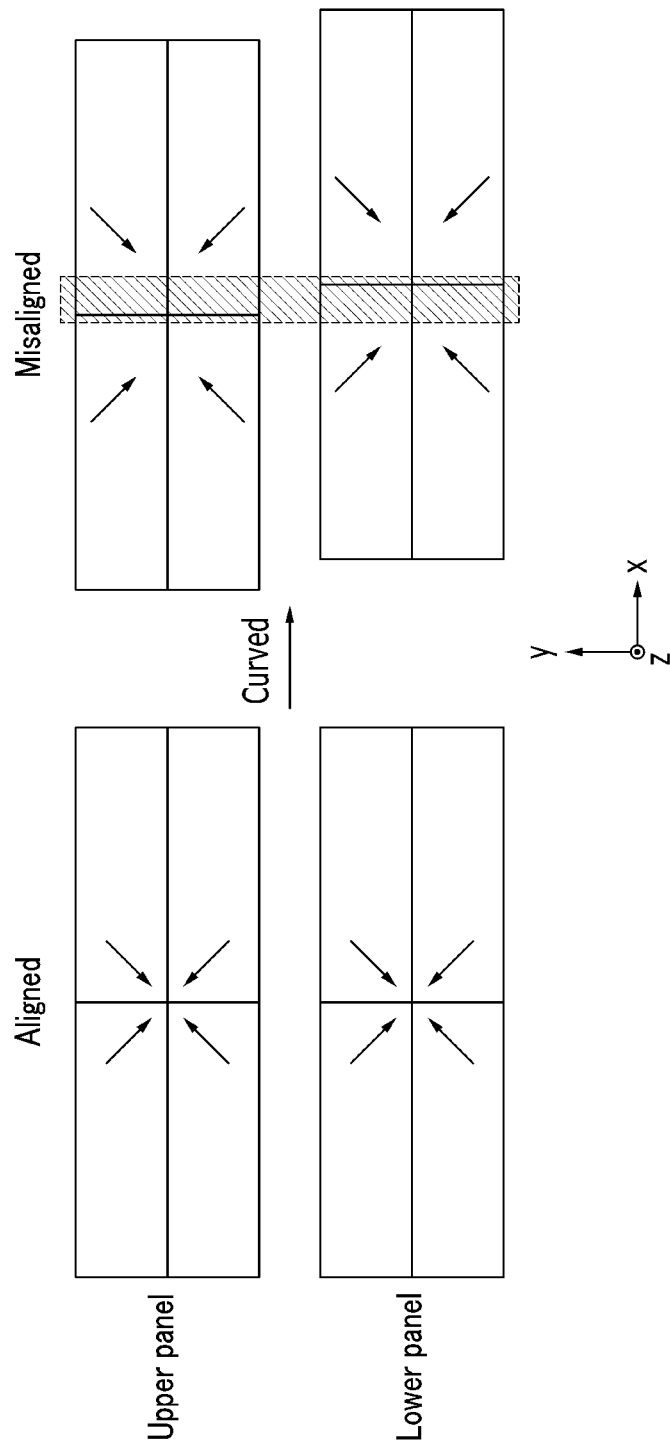
Figure 7:
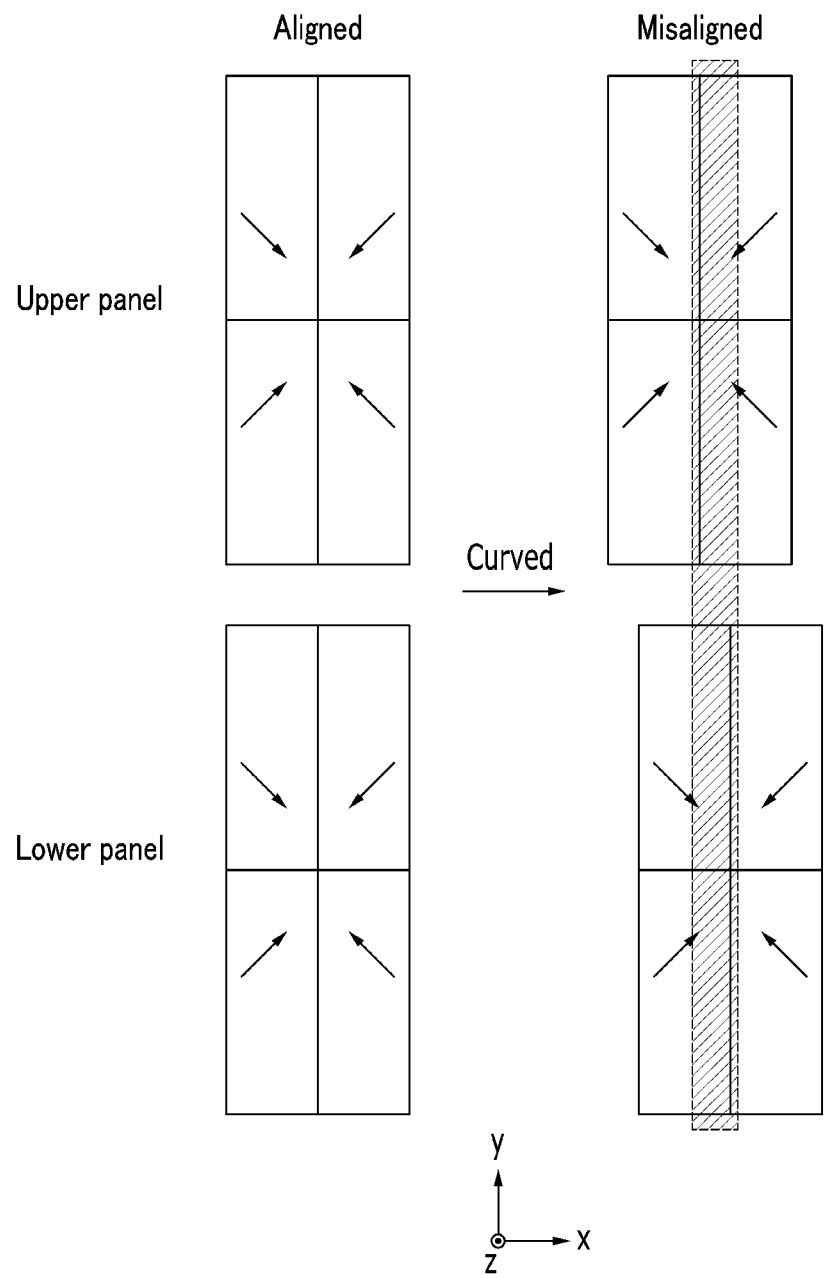
FIG. 7 is a diagram exemplifying misalignment of pretilt directions and texture due to misalignment between an upper panel and a lower panel which occurs in a curved display panel in a liquid crystal display according to a Comparative Example.

FIG. 6 is a diagram exemplifying misalignment of pretilt directions and texture due to misalignment between an upper panel and a lower panel which occurs in a curved display panel in the liquid crystal display according to the exemplary embodiment of the present invention, and FIG. 7 is a diagram exemplifying misalignment of pretilt directions and texture due to misalignment between an upper panel and a lower panel which occurs in a curved display panel in a liquid crystal display according to Comparative Example.

First, referring to FIG. 6, in the display panel according to the exemplary embodiment of the present invention, pixels which have quadrangular shapes in which a ratio of a short side to a long side is about 3:1 are disposed so that the long sides are parallel to the x axis and the short sides are parallel to the y axis. In FIG. 6, a large quadrangle represents one pixel and small quadrangles represent four domains.

The liquid crystal molecules 31 of the liquid crystal layer 3 are aligned to have pretilts which are tilted in the same direction as the length direction of a cutout pattern of the pixel electrode 191 while the electric field is not applied, and the pretilt direction is represented by an arrow. In the state where the display panel is flat before being curved, the pretilt direction by the lower panel 100 coincides with the pretilt direction by the upper panel 200. However, when the display panel is curved on the y axis to form the curved display panel, the alignment of the lower panel 100 and the upper panel 200 is distorted in an x-axial direction. As a result, like a portion represented by a dotted quadrangle, a region where the pretilt direction by the lower panel 100 and the pretilt direction by the upper panel 200 are misaligned occurs, and in the region, texture occurs. However, since the short sides of the pixel are disposed to be parallel to a reference axis (y axis) of the curved panel, even though the lower and upper panels 100 and 200 are misaligned in the x-axial direction, the region where the pretilt directions are misaligned may be minimized.

Referring to FIG. 7, the pixel has a quadrangle of which a ratio of the short side to the long side is about 1:3, but unlike the exemplary embodiment of the present invention, an example in which the short sides of the pixel are parallel to the x axis and the long sides are parallel to the y axis is illustrated. As illustrated at a left side of FIG. 7, in the state where the display panel is flat before being curved, the pretilt direction by the lower panel 100 coincides with the pretilt direction by the upper panel 200. When the display panel is curved on the y axis to form the curved display panel, like the exemplary embodiment of FIG. 6, the alignment of the lower panel 100 and the upper panel 200 is distorted in the x-axial direction. As a result, like a portion represented by the shaded quadrangle, a region where the pretilt direction by the lower panel 100 and the pretilt direction by the upper panel 200 are misaligned occurs, and in the region, texture occurs. However, since the long sides of the pixel are disposed to be parallel to the reference axis (y axis) of the curved panel, as compared with the exemplary embodiment of FIG. 6, the region where the texture occurs is much larger. Since the ratio of the short side to the long side of the pixel is 1:3, the region where the texture occurs according to Comparative Example becomes about three times. In other words, in the case of the exemplary embodiment of FIG. 6, even though the pretilt directions are misaligned when the curved display panel is formed, as compared with Comparative Example, the region where the texture occurs may be reduced by about ⅓. Even though the areas of the pixels are the same as each other, as an aspect ratio of the pixel is larger, the region where the texture occurs may be smaller.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display device, comprising:
a display panel which includes a lower panel including a thin film transistor, a pixel electrode connected to the thin film transistor, and a light blocking member;
an upper panel facing the lower panel; and
a liquid crystal layer positioned between the lower panel and the upper panel and including liquid crystal molecules;
wherein the liquid crystal display device is in a vertically aligned mode, the display panel is a curved display panel which is curved on a first axis,
the pixel electrode has long sides and short sides, and the long sides are arranged to be substantially parallel to a second axis perpendicular to the first axis to reduce a region where a pretilt direction by the upper panel and a pretilt direction by a lower panel are misaligned upon the display panel being curved, and
the light blocking member and the pixel electrode are both arranged in the lower panel to reduce or eliminate misalignment between the light blocking member and the pixel electrode upon the display panel being curved.

2. The liquid crystal display device of claim 1, wherein:
the short sides of the pixel electrode are arranged to be substantially parallel with the first axis.

3. The liquid crystal display device of claim 1, wherein:
the lower panel further includes a column spacer positioned on the light blocking member.

4. The liquid crystal display device of claim 3, wherein:
the column spacer is formed of the same material as the light blocking member, wherein the lower panel further includes a lower alignment layer arranged on each of the light blocking member, the pixel electrode and the column spacer.

5. The liquid crystal display device of claim 1, wherein:
the upper panel includes a common electrode, and
the pixel electrode includes a plurality of domains in which tilted directions of the liquid crystal molecules are differently controlled.

6. The liquid crystal display device of claim 5, wherein:
the pixel electrode includes stems which form a boundary between adjacent domains.

7. The liquid crystal display device of claim 6, wherein:
the pixel electrode further includes a plurality of minute branches which extends in different directions in different domains.

8. The liquid crystal display device of claim 7, wherein:
the stems include a first stem and a second stem which cross each other to form a cross, and
the plurality of minute branches extends in different directions in four domains which are divided by the first and second stems.

9. The liquid crystal display device of claim 8, wherein:
the first stem is arranged to be substantially parallel to the first axis, and the second stem is arranged to be substantially parallel to the second axis.

10. The liquid crystal display device of claim 8, wherein:
the length of the first stem is larger than the length of the second stem.

11. The liquid crystal display device of claim 1, wherein:
the thin film transistor is positioned between two pixel electrodes which are adjacent to each other in the first axial direction.

12. The liquid crystal display device of claim 1, wherein a ratio of the short side to the long side of the pixel electrode is about 3:1.

13. The liquid crystal display device of claim 1, wherein:
the lower panel further includes a color filter.

14. The liquid crystal display device of claim 1, wherein:
the light blocking member is formed to cover a peripheral area of the pixel electrode.

15. The liquid crystal display device of claim 1, wherein:
the column spacer includes a main column spacer and a sub column spacer, the main column spacer is higher than the sub column spacer.

16. The liquid crystal display device of claim 1, wherein:
the display panel is a curved display panel which is further curved on the second axis.

17. The liquid crystal display device of claim 3, the column spacer having a top surface that contacts an inner surface of the upper panel, the inner surface of the upper panel being flat to allow the top surface of the column spacer to slide and move laterally with respect to the inner surface of the upper panel upon the liquid crystal display device being curved and bent.

18. The liquid crystal display device of claim 13, wherein each of the pixel electrode, the color filter and the light blocking member are all arranged on the lower panel to reduce or eliminate misalignment between the pixel electrode and each of the color filter and the light blocking member upon the liquid crystal display device being curved.

19. The liquid crystal display device of claim 1, wherein the pixel electrode includes a protrusion that is connected to the thin film transistor by way of a contact hole, wherein the upper panel includes a common electrode covering an entire surface thereof.

* * * * *